United States Patent [19]

Giroux

[11] Patent Number: 4,657,165

[45] Date of Patent: Apr. 14, 1987

[54] MECHANICAL MEANS FOR PREVENTING THE TWISTING OF A FIBER OPTIC CABLE WHILE TEMPORARILY STORING THE SAME

[76] Inventor: D. William Giroux, 3 Lakewood Villa, Lake Manawa, Council Bluffs, Iowa 51501

[21] Appl. No.: 782,119

[22] Filed: Sep. 30, 1985

[51] Int. Cl.$^4$ .................... B65H 49/00; B65H 54/56; B65H 57/08
[52] U.S. Cl. .................................. 226/183; 226/176; 226/181; 226/182; 226/196
[58] Field of Search ............... 226/181, 183, 186, 187, 226/176, 177, 196, 182; 242/157 R, 76; 72/135, 137, 142

[56] References Cited

U.S. PATENT DOCUMENTS

| | | |
|---|---|---|
| 2,732,060 | 1/1956 | Zaveruha . |
| 3,527,126 | 9/1970 | Jones, Jr. ............................ 226/176 |
| 3,675,864 | 7/1972 | Eschenbach ........................ 242/47 |
| 3,777,964 | 12/1973 | Kruner et al. ...................... 226/183 |
| 3,842,778 | 10/1974 | Shibata ................................ 242/83 |
| 3,906,772 | 9/1975 | Properzi ........................... 226/177 X |
| 4,235,419 | 11/1980 | Schuck ............................ 226/182 X |
| 4,415,140 | 11/1983 | Deering ........................... 226/183 X |

Primary Examiner—Stuart S. Levy
Assistant Examiner—Lynn M. Sohacki
Attorney, Agent, or Firm—Zarley, McKee, Thomte, Voorhees & Sease

[57] ABSTRACT

A mechanical figure eighting apparatus is disclosed which permits a fiber optic cable to be deposited on the ground in a random or figure eight configuration. Fiber optic cable is passed over a rotating drive wheel and is held in frictional engagement with the peripheral rim portion of the drive wheel by a pressure wheel mounted thereover. The fiber optic cable is passed or pushed outwardly through a tubular member extending outwardly from the drive wheel. The fiber optic cable is deposited on the ground in a random fashion or figure eight fashion as it is discharged from the tubular member.

1 Claim, 3 Drawing Figures

MECHANICAL MEANS FOR PREVENTING THE TWISTING OF A FIBER OPTIC CABLE WHILE TEMPORARILY STORING THE SAME

BACKGROUND OF THE INVENTION

Fiber optic cable is usually installed under ground either in conduit that has previously been installed or directly buried by means of plows or trenching equipment. In either case, it is quite often necessary to unspool thousands of feet of cable off the supply reel so that the cable can be fed through a conduit under roadways, utilities, etc. To date, this unspooling of cable into a temporary storage pile has been performed by hand labor which hand loops the cable in a figure eight pattern so as to prevent twisting and kinking of the cable in the storage operation. This manual figure eighting of the cable is not only very tiring to the crew, it is very time-consuming and may subject the cable to physical damage by workers stepping on the cable. As physical splices of fiber optic cable are very expensive, the trend is to supply longer and longer lengths of cable, therefore making the method and speed of figure eighting even more important than in the past.

The requirement that the fiber optic cable be manually "figure eighted" requires additional manpower and therefore increases the cost of installing the fiber optic cable.

It is therefore a principal object of the invention to provide a means for mechanically figure eighting and thus preventing the twisting of a fiber optic cable.

A further object of the invention is to provide a means for mechanically figure eighting fiber optic cable.

A further object of the invention is to provide a means for mechanically figure eighting fiber optic cable which is easily adjustable and which is convenient to use.

It is also a principal object of the invention to provide a means for the mechanical figure eighting of the cable at a speed much faster than can be done manually and with much less manpower.

A further object of the invention is to provide a means for figure eighting a cable so that the cable will not be damaged by twists as would be the case if the cable were stored in continuous circles.

These and other objects will be apparent to those skilled in the art.

SUMMARY OF THE INVENTION

A rotating drive wheel is mounted on a suitable support and is rotated about a horizontal axis by a hydraulic motor or the like. The drive wheel has a recessed peripheral rim portion over which the fiber optic cable is extended. A pressure wheel is mounted over the drive wheel and is received by the peripheral rim portion of the drive wheel. The pressure wheel exerts downward force on the fiber optic cable so that the fiber optic cable is forced into frictional engagement with the peripheral rim portion of the drive wheel. As the fiber optic cable passes from the drive wheel, it passes through a hollow tube means which extends outwardly therefrom. The fiber optic cable passes from the tube means and drops on the ground in a substantial "figure eight" configuration. When the fiber optic cable is subsequently removed, the cable will not twist due to the manner in which the fiber optic cable was deposited on the ground.

DESCRIPTION OF THE PREFERRED EMBODIMENT

Figure 1:
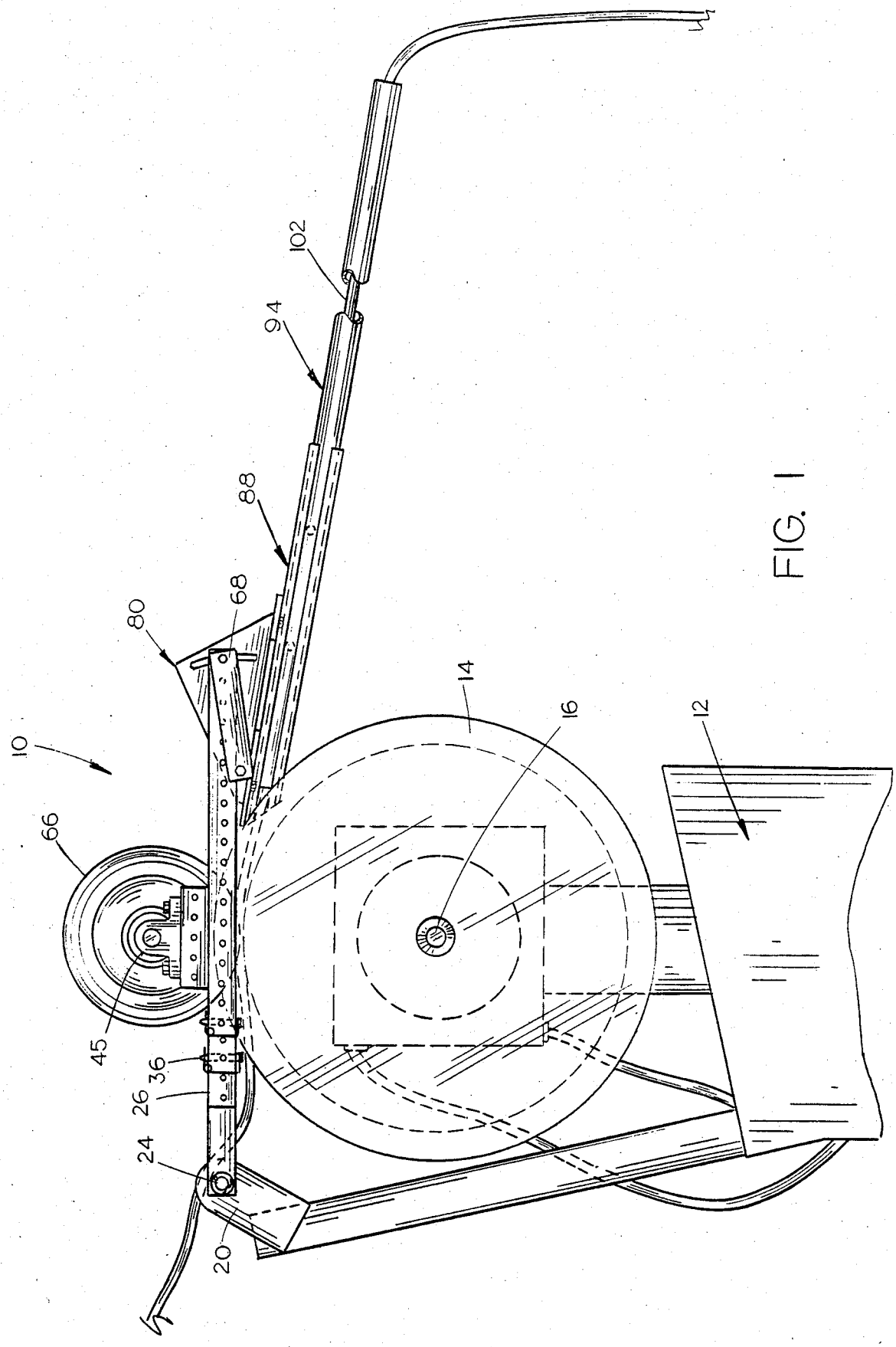
FIG. 1 is a side elevational view of the apparatus of this invention.
Figure 2:
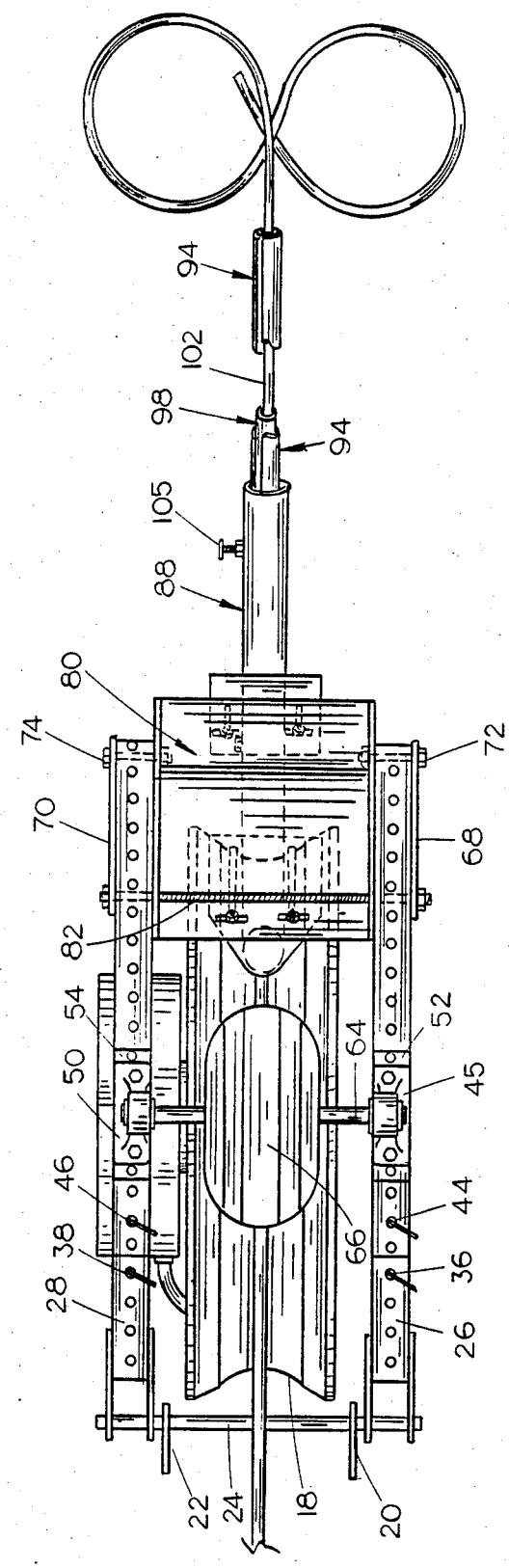
FIG. 2 is a top elevational view of the apparatus of this invention.

The mechanical figure eighting apparatus of this invention is referred to generally by the reference numeral 10. Apparatus 10 includes a support frame means 12 which may be mounted on a trailer, tractor or other suitable means. Drive wheel 14 is rotatably mounted on support frame means 12 about axis 16 and is powered by a suitable power source (not shown) such as a hydraulic motor or the like to rotate the same in a clockwise direction as viewed in FIG. 1. Drive wheel 14 includes a recessed peripheral rim portion 18 as seen in FIG. 2.

Figure 3:
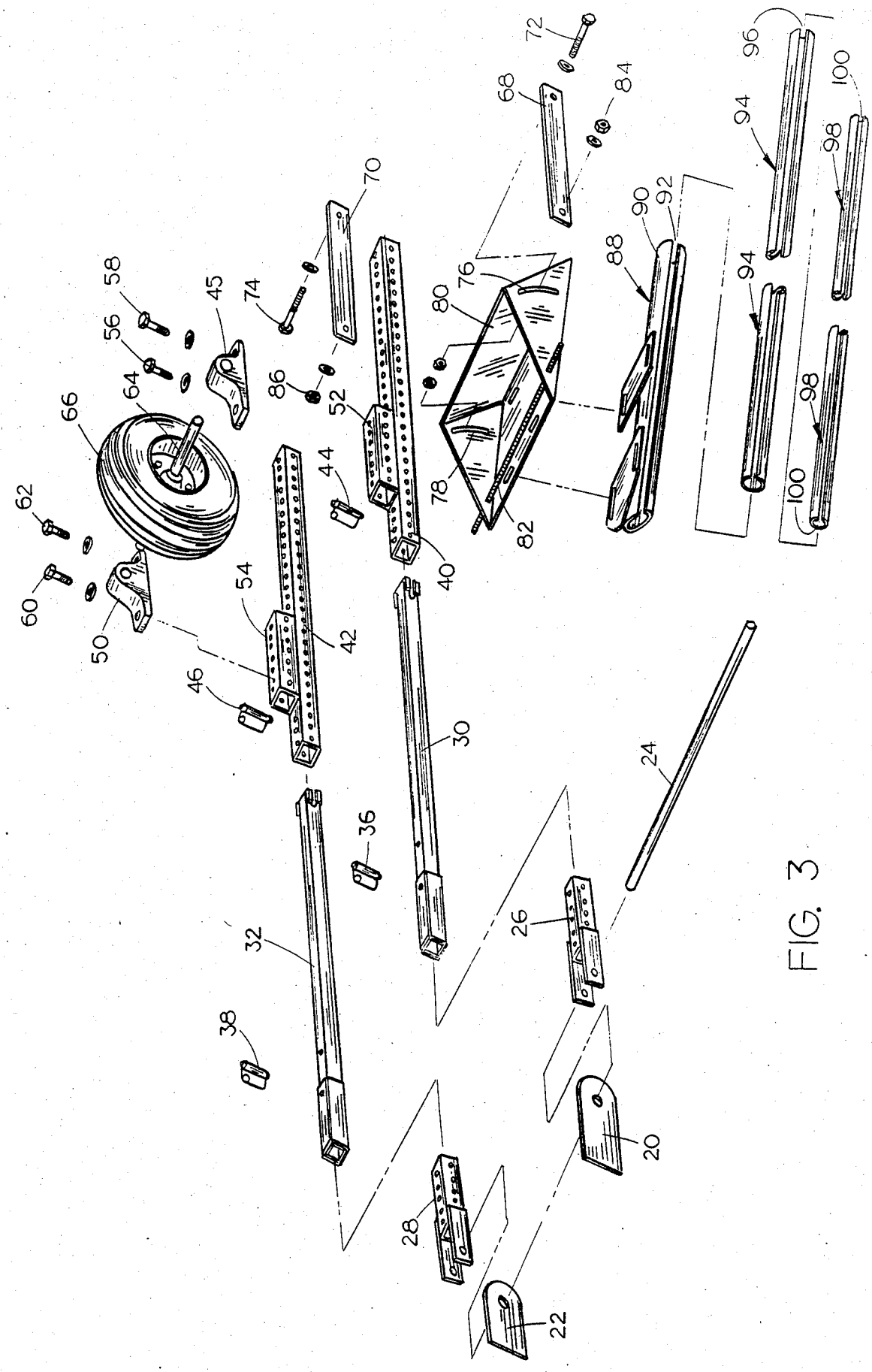
FIG. 3 is an exploded perspective view of the apparatus of this invention.

Support frame means 12 includes a pair of upstanding arms 20 and 22 which have a horizontally disposed shaft 24 mounted thereon. Tube brackets 26 and 28 are pivotally mounted on the ends of the shaft 24 and have tubular members 30 and 32 selectively longitudinally adjustably secured thereto respectively by pin assemblies 36 and 38, respectively as shown in FIG. 3. Tubular members 40 and 42 are selectively longitudinally adjustably mounted on tubular members 30 and 32 respectively by pin assemblies 44 and 46. Block bearings 45 and 50 are adjustably mounted on tubular supports 52 and 54 by bolts 56, 58, 60 and 62. Tubular supports 52 and 54 are secured to tubular members 40 and 42 by welding or the like.

Hub assembly 64 is rotatably mounted in bearings 45 and 50 and has a resilient tire 66 mounted thereon which is partially received by the recessed rim portion 18 of drive wheel 14 as seen in the drawings.

Arms 68 and 70 are selectively pivotally secured at one end thereof to tubular members 40 and 42 by bolt assemblies 72 and 74 respectively. Bolt assemblies 72 and 74 also pass through slots 76 and 78 of support pan 80 which is adjustably positioned between tubular members 40 and 42. Shaft or bolt 82 extends through the rearward end of pan 80 and has the lower or rearward ends of arms 68 and 70 mounted thereon and held thereon by nut assemblies 84 and 86.

Support 88 is adjustably secured to the underside of pan 80 and includes a tube 90 having a longitudinally extending slot 92 formed thereon. Tube 94 is selectively received by and mounted in tube 90 by a screw 105. As seen in the drawings, tube 94 extends outwardly from the apparatus. Tube 94 has a slot 96 formed therein which is adapted to register with slot 92. Tube 98 is rotatably mounted in tube 94 and has a slot 100 formed therein adapted to register with slots 96 and 92 to install the cable therein, then twisted to unregister the slots for operation as will be described in more detail hereinafter.

When fiber optic cable is being pulled through a pipe or conduit by suitable pulling equipment, or plowed into the ground, it is necessary to position the pulled fiber optic cable on the ground until the next pulling or plowing operation. The cable 102 is positioned in the rim portion 18 beneath the tire 66 by simply pivotally movably raising the outer end of the supporting structure for the tire 66 which disengages the tire 66 from the drive wheel 14. The slots 92, 96 and 100 are aligned at this time so that the cable may be inserted into the tubes 98 and 94 thereby eliminating the need for threading the cable through the tubes from one end to the other. The tubes 98 and 94 are then rotated relative to one another so that the slots 100 and 96 no longer register which prevents the cable from inadvertently moving out of the tubes 94 and 98.

During the initial installation, the various tubes, pan and supporting structure are adjusted until the tubes are positioned in the desired attitude. The drive motor on the drive wheel 14 is then actuated to cause the rotation thereof. Rotation of drive wheel 14 and the pressure of tire 66 on cable 104 as drive wheel 14 is rotated causes the cable to be pulled therebetween and pushed outwardly through the tubes. The cable exiting from the tubes drops on the ground in a random fashion or figure eight fashion as illustrated in the drawing. The random dropping fashion prevents the cable from twisting when the cable is subsequently pulled from its pile.

The cable, as it extends to the ground, would normally lay itself in a figure eight pattern. Cable of this type is normally torque balanced, meaning that in its natural straight configuration, it does not have a tendency to twist. However, this same type of cable will twist ever so slightly as the cable is layed in a circle. Thus the cable by its own internal construction will normally twist 360° in one direction and the opposite direction in a figure eight pattern. The adjustable support can be adjusted for various construction of cable to obtain a desirable discharge level from tube 102 to form a proper path to achieve a figure eight pattern.

Thus it can be seen that a novel mechanical figure eighting attachment has been provided which eliminates the need for manually figure eighting the fiber optic cable prior to being pulled through a conduit or the like by a mechanical puller or the like. It can therefore be seen that the mechanical figure eighting attachment of this invention accomplishes at least all of its stated objectives.

I claim:

1. A means for preventing the snarling of a fiber optic cable comprising,
   a drive wheel support means,
   a drive wheel rotatably mounted on said support means, said drive wheel having a concave shaped peripheral rim surface adapted to receive a fiber optic cable extending thereover,
   means for rotating said drive wheel,
   a pressure wheel support means operatively pivotally mounted on said drive wheel support means,
   a pressure wheel rotatably mounted on said pressure wheel support adjacent said drive wheel for pressing the fiber optic cable into frictional engagement with said concave shaped peripheral rim of rotating drive wheel so that the fiber optic cable will be pushed in the direction of rotation of said drive wheel,
   and an elongated tubular guide means having one end positioned adjacent said drive wheel which receives the fiber optic cable being pushed by said drive wheel, the other end of said tubular guide means being positioned outwardly of said drive wheel whereby the optic cable being pushed through said tubular guide means will pass outwardly from the said other end of said tubular guide means and drop to the ground with the inherent characteristics of the fiber optic cable causing said fiber optic cable to drop to the ground in a substantial figure eight pattern so that said fiber optic cable will not snarl when it is subsequently pulled from the pile of fiber optic cable on the ground,
   said tube means comprising an inner tube member and an outer tube member embracing at least a portion of said inner tube member, each of said tube members having an elongated slot formed therein extending between the ends thereof, said tube members being rotatable and selectively locked with respect to each other to permit said slots to either be aligned or nonaligned, said tubes being rotatable from an aligned position to a nonaligned position to prevent the cable from becoming disengaged from the tube members.

* * * * *